Sept. 10, 1957     R. W. KETCHLEDGE     2,806,200
AMBIENT TEMPERATURE COMPENSATION OF THERMISTORS
Filed Dec. 17, 1952
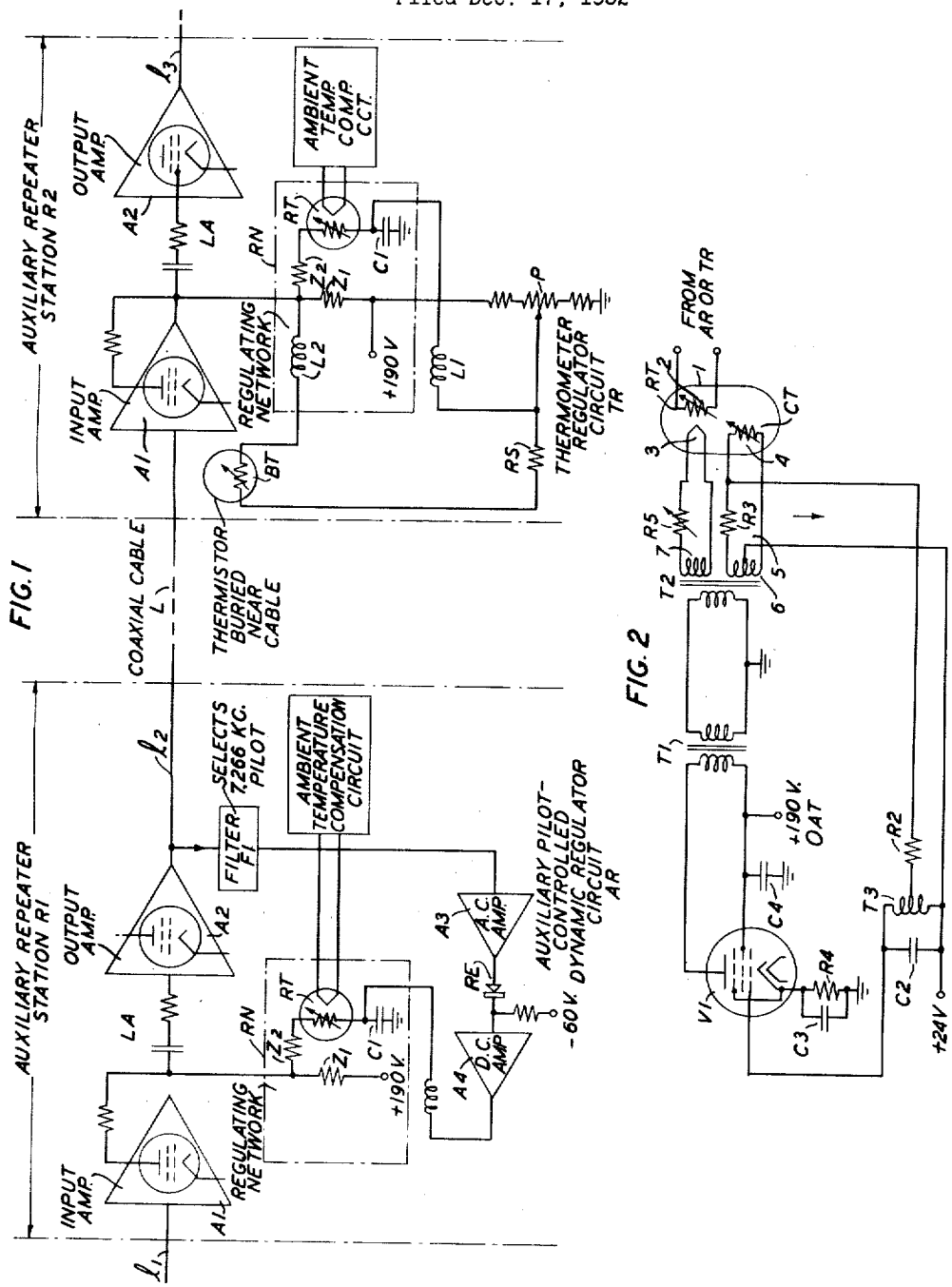
INVENTOR
R. W. KETCHLEDGE
BY
Earl C. Laughlin
ATTORNEY

United States Patent Office

2,806,200
Patented Sept. 10, 1957

---

2,806,200

AMBIENT TEMPERATURE COMPENSATION OF THERMISTORS

Raymond W. Ketchledge, Middlesex, N. J., assignor to Bell Telephone Laboratories, Incorporated, New York, N. Y., a corporation of New York Application December 17, 1952, Serial No. 326,569

12 Claims. (Cl. 323—68)

The invention relates to electric transmission systems and particularly to circuits for regulating transmission in such systems, employing thermistors as the regulating control elements.

A thermistor is a device made of solid conducting or non-conducting materials whose electrical resistance varies rapidly with temperature. There are three common ways of using such thermistors in an electrical circuit. In the first or externally heated method, the thermistor is used in the electrical circuit to provide an electrical resistance varying in accordance with the ambient temperature, i. e. the temperature of the surrounding medium. In the second or directly heated method, the electric current in the circuit is allowed to flow directly through the thermistor thereby heating it so as to change its effective impedance in the circuit accordingly. In the third or indirectly heated method, a separate heating coil, located closely adjacent to and electrically insulated from the variable resistance element or bead of the thermistor, is heated by the electric current passed through it from an associated controlling circuit, and the heat thereby generated by the coil is utilized to heat the resistance element or bead of the thermistor and thus vary its impedance value in the circuit. Such thermistors are described in more detail in an article entitled, "Properties and Uses or Thermistors—Thermally Sensitive Resistors" by J. A. Becker, C. B. Green and G. L. Pearson, in the Transactions of the American Institue of Electrical Engineers, volume 65, November, 1946, pages 711 through 725.

The invention is particularly applicable to, and will be described as applied to, circuits utilizing thermistors for automaticaly regulating the gains of the repeaters in a broad-band coaxial cable system for television or multiplex carrier telephone transmission, to correct for equalization errors due to variations in cable length and temperature. Both of these effects cause gain deviations having a square root of frequency shape, and the regulating networks of the line amplifiers in the repeaters are designed, therefore, to produce corresponding inverse shapes. In such circuits, the control thermistor is connected as a shunt element in the regulating network in each line amplifier at the repeater stations and controls the loss of the network and hence the amplification produced by the line amplifiers in all signal waves transmitted therethrough. The resistance of the control thermistor is determined both by the ambient temperature and the amount of electrical energy impressed upon the thermistor.

An object of the invention is to improve the operation of circuits employing thermistors for automatically regulating the gain of the repeaters in an electric transmission system.

A more specific object is to automatically adjust the temperature of the control thermistor in a regulating circuit for a broad-band cable carrier signaling system in such manner as to prevent its performance being affected by ambient temperature variations while maintaining it accurately responsive to the electrical energy changes produced by cable temperature changes.

Another specific object is to obtain very precise temperature compensation of a thermistor over a wide temperature range.

A further object is to produce a desired distortion characteristic in an amplifier without reduction in signal frequency gain.

Another object is to produce an amplifier whose gain is independent of signal level.

These objects are attained in accordance with the invention by the provision of a circuit arrangement for impressing on each control thermistor an additional amount of electrical energy which is approximately inversely proportional to the ambient temperature to render the thermistor insensitive to the ambient temperatures over the range usually encountered in practice.

In accordance with one embodiment of the invention, one or more indirectly-heated thermistors operating as the regulating thermistors in a repeater gain regulating circuit are supplied with auxiliary heating power approximately inversely proportional to the ambient temperature from an oscillation generator whose output is controlled by another thermistor of the directly-heated type having power-temperature characteristics similar to those of the regulating thermistors, which is located in close proximity to the latter thermistors so as to be subject to the same ambient temperature conditions. The other thermistor is located in one arm of a bridge circuit which is in the feedback path of the oscillation generator, so that its resistance value is determined both by the electrical energy received from the generator output and thermal energy due to ambient temperature. The oscillator oscillates at a power level such that the bridge unbalance is maintained constant at that value which produces unity transmission around the feedback loop. Ambient temperature changes cause momentary changes in bridge unbalance which, in turn, cause the oscillation power level to adjust to a new value which restores the bridge unbalance to its original value. Thus, the oscillator maintains the resistance of the second thermistor at a constant value independent of ambient temperature. Since the oscillator power level compensates the second thermistor perfectly, an appropriate fraction of this power may be fed to the first thermistor accurately to compensate it for ambient temperature.

A feature of the invention is the use in said oscillator generator of an amplifying device with associated feedback providing compression distortion in the device which will assist in providing a more stable oscillation level in said generator.

A more thorough understanding of the objects and features of the invention may be obtained by a study of the following detailed description of one embodiment thereof when read in conjunction with the accompanying drawing in which:

Fig. 1 is a block diagram of a portion of a repeatered, broad-band carrier wave signaling system employing different types of amplifier gain regulating circuits utilizing thermistors, at repeater stations, to which the thermistor ambient temperature compensating circuits in accordance with the invention are applied; and Fig. 2 shows schematically one embodiment of a circuit in accordance with the invention for providing ambient temperature compensation of the thermistors in the regulating circuits of a system such as shown in Fig. 1.

The ambient temperature compensating circuit in accordance with the invention was developed for use with the repeaters of a two-way broad-band repeatered coaxial cable carrier system providing on one pair of coaxials in a total frequency range of 0.3 to 8.35 megacycles alternatively, either 1,800 telephone circuits or 600 telephone circuits plus a high-grade, two-way four-megacycle television circuit, or a single seven-megacycle television circuit. In this system, the repeater stations are spaced at intervals of approximately four or three miles, depending on the size (0.375 inch or 0.27 inch) of cable used. Each two-way repeater at these stations is designed to provide amplification and regulation over the frequency band of 0.3 through 8.35 megacycles of the telephone and/or television channels as well as six pilot channels of the frequencies 308, 556, 2064, 3096, 7266 and 8320 kilocycles transmitted over the cable for regulating purposes, closely equal to the loss of the associated four-mile or three-mile cable sections.

Fig. 1 shows a block diagram of a portion of such a carrier system, including the coaxial cable L for the west-to-east direction of transmission comprising a plurality of tandem-connected cable sections, $l_1$, $l_2$, $l_3$, . . . etc. between each two successive cable sections of which a repeater station R1, R2, . . . is interposed. Each repeater station R1, R2, . . . includes in the line for each direction of transmission, as indicated in the line illustrated, a line amplifier LA consisting of an input amplifier A1 and an output amplifier A2 interconnected by a regulating network RN, for providing the desired amount of amplification of the signals received from the preceding section of coaxial cable, and an associated circuit for regulating the gain of this amplifier to compensate for equalization errors due to variations in cable length and temperature. This regulating circuit may be: (1) a so-called auxiliary regulator AR, as illustrated diagrammatically at repeater station R1, which is a dynamic regulator adapted for controlling the gain of the associated line amplifier in accordance with the level of the 7266 kc. pilot at the output of that amplifier; or (2) a so-called thermometer regulator TR, as illustrated diagrammatically at repeater station R2, which is adapted for controlling the gain of the associated line amplifier in accordance with the resistance of a thermistor buried near the transmission cable so that its resistance can be used as a control element in the associated regulating circuit, approximating the cable temperature, to correct for changes in cable loss due to temperature.

Each of these two types of regulating circuit includes as a component element the regulating network RN of each of the associated line amplifiers LA. The regulating network RN is a thermistor-controlled equalizer acting as an interstage between the input and output amplifiers A1 and A2 to provide a transmission characteristic that varies proportionally to the square root of the frequency at all frequencies in the transmitted band. The configuration of the network RN may be of the type disclosed in the United States Patent 2,096,027, issued October 19, 1937 to H. W. Bode, and described in the Bell System Technical Journal article of April, 1938, pages 229–244, entitled, "Variable Equalizers" by H. W. Bode. In effect, this regulating network, as shown in Fig. 1, comprises shunt and series impedances, Z1 and Z2, terminated by the variable resistance element or bead of the regulating thermistor RT operating as the gain controlling element for the associated line amplifier LA. The thermistor RT is connected as a shunt element in the regulating network RN, and its resistance value determines the loss of the network and thus the gain provided by the associated line amplifier and the amplification of all the signals transmitted thereby. The resistance of the thermistor RT is determined both by the ambient temperature and the amount of electrical energy impressed on the thermistor, and for proper operation of the regulating network its resistance value should only vary in accordance with the electrical energy changes produced by cable temperature changes.

The control circuit for the regulating thermistor RT in the dynamic or auxiliary regulator AR shown at repeater station R1 in Fig. 1 includes a band-pass filter F1 for picking off one energy portion of the 7266 kc. pilot wave appearing in the output of the line amplifier LA, this filter being designed to eliminate from the control circuit all signals except that pilot; an A.-C. amplifier A3 for amplifying the selected pilot signal, a diode detector RE for rectifying the resulting pilot signal; and a D.-C. amplifier A4 to which the rectified pilot signal is applied in series with a fixed reference voltage source (indicated as −60 volts), for amplifying the resulting D.-C. signal. The output current of the D.-C. amplifier A4 flowing through the bead or variable resistance element of the regulating thermistor RT causes that element to be heated in accordance with deviations of the pilot level from a predetermined reference value to change the gain of the associated line amplifier LA accordingly. More detailed information on the circuit details and operation of such a pilot-controlled dynamic regulator is given in the United States patent to Bollman, No. 2,254,205, issued September 2, 1941, or the United States patent to Krist, No. 2,246,307, issued June 17, 1941.

The thermometer regulator TR shown at repeater station R2 in Fig. 1 is utilized to provide compensation for cable loss changes with temperature by providing an equivalent gain variation in the line amplifiers LA in the coaxial cables used for opposite directions of transmission. It accomplishes this by causing changes in the heating power to the bead of the regulating thermistor RT in the regulating network RN in each line amplifier LA, which are proportional to the temperature variations in the cable. The power transmitted to the thermistor RT is controlled by the operation of a gain adjusting potentiometer P having a manually operated control, and an externally connected regulator whose resistance in series with one or more resistors RS and the fixed choke coil L2 shunts the series circuit including the bead of the regulating thermistor RT, the fixed choke coil L1, and impedance 32 of the network RN. The potentiometer P in series with a plurality of resistors and a capacitor C1 is connected across the bead of regulating thermistor RT, and a source of direct current voltage, which may be a 190-volt battery as shown, is connected across a portion of this network. The position of the variable arm of the potentiometer P determines the portion of this voltage that is applied to the network RN. The externally connected regulator referred to is the thermistor BT buried near the main transmission cable so that its resistance varies with the cable temperature. The resistance determined by the series combination of the resistor RS and the buried thermistor BT, controls the power applied to the regulating thermistor as it is connected effectively in parallel with the circuit containing the latter thermistor. More detailed information on the circuit details and operation of this thermometer regulator is given in the copending application of N. W. Bell, Serial No. 326,557, filed December 17, 1952, in which it is disclosed and claimed.

Over the usual temperature range to which the thermistors in each of the regulating circuits described above are subjected, conventional temperature compensation methods would result in resistance variations of the thermistor beads of the order of 10–20 percent. In addition, a capacitance of 5–10 micromicrofarads is introduced across the thermistor in each regulating network. Both of these conditions were found to be intolerable with respect to the precise limitation of transmission variation for which the carrier system above described was to be designed. The 10–20 percent error of correction for temperature changes would impair the operation of the thermometer regulator TR to the extent that it would be unsatisfactory in accomplishing the purpose for which it was intended. The presence of 5–10 micromicrofarads of capacitance across the thermistor of the regulating network would result in serious frequency characteristic errors of the network which would make necessary extensive and complicated equalization measures.

The expected ambient temperature range of unattended repeater huts is from about −20° F. to +160° F. The ambient temperature compensating circuit of the invention represented by the box so labeled connected across the heater of the thermistor RT at repeater stations R1 and R2 of Fig. 1, is designed to operate over this temperature range holding the resistance of the regulating thermistor bead very nearly constant.

Fig. 2 shows schematically one type of circuit in accordance with the invention which can be used to render the regulating thermistor RT in the regulating network RN associated with each type of regulator shown in Fig. 1 and described above, insensitive to ambient temperature from —20° F. to +160° F. An essential part of this circuit is the temperature compensating thermistor CT which is located in close proximity to the regulating thermistor RT so as to be subjected to the same temperature conditions and, as shown, is preferably contained in the same glass envelope 1 as the variable resistance element or bead 2 of the regulating thermistor RT and its associated heater 3. The thermistor CT is made to have substantially the same thermal characteristics as thermistor RT. The heater 3 of the regulating thermistor RT is under control of an ambient temperature oscillator O$_{AT}$ which is the source of the additional electrical heating power which varies inversely as the ambient temperature. The bead 4 of the compensating thermistor CT is located in a bridge circuit of the oscillator O$_{AT}$ and its resistance controls the action of that oscillator. The function of the oscillator O$_{AT}$ is to pump just enough power into the heater 3 to keep the resistance of the bead 2 of the regulating thermistor RT from varying with ambient temperature, thus leaving it free to respond only to electrical power received from the associated regulator AR or TR. The transfer of thermal energy from the heater 3 to the bead 2 of thermistor RT is an indirect heating effect. The reception of electrical power from the associated regulator AR or TR is due to direct current from the regulator passing through the bead of RT and is a direct heating effect.

The oscillator loop consists of the pentode tube V1, output transformer T1, the bridge transformer T2, the bridge circuit 5 and the input coil (autotransformer) T3, and the necessary circuit components to obtain the proper voltages on the elements of the tube V1. The reason for the two transformers T1 and T2 between the tube V1 and the bridge 5 is to keep direct current out of the bridge transformer windings.

The bridge 5 consists of a tapped secondary 6 on the transformer T2 in parallel with a resistor R3 and the bead 4 of the compensating thermistor CT in series. A second secondary 7 on the transformer T2 is connected across the heater 3 of the regulating thermistor RT through the variable series resistor R5, the latter resistor being provided to permit adjustments for manufacturing differences between the two thermistors, RT and CT. The output of the bridge 5 by means of connections to the tap on the secondary 6 of transformer T2 and to a point between the resistor R3 and the bead 4 of CT, is fed back to the control grid of the tube V1 through the series resistor R2 and autotransformer T3. A voltage of +24 volts is applied to the control grid of the tube V1 through the autotransformer T3. Self-bias for the tube V1 is provided by the cathode current of the tube flowing through the resistor R4 connected between the cathode of that tube and ground. A capacitor C2 is connected across the terminals of the input transformer T3, and the parallel circuit thus formed is tuned to 4 kilocycles per second. The output transformer T1 may be untuned as shown or tuned to 4 kc. by means of a suitable capacitor (not shown) connected across its primary winding. The cathode and screen grid of tube V1 may be by-passed to ground through capacitors C3 and C4, respectively.

For stable oscillation, the gain around the oscillator loop must be unity with zero phase angle at the intended frequency of oscillation, 4,000 cycles per second, although this frequency is not critical in the operation of the circuit. When the bridge 5 is balanced there is no output and hence no oscillation. This occurs at about 168° F., which is above the highest expected ambient temperature.

The operation of the ambient temperature compensating circuit of Fig. 2 may be described as follows: At balance, there is high loss through the bridge 5. When the ambient temperature decreases from 168° F., the resistance of the compensating thermistor CT increases and the bridge becomes unbalanced. As this unbalance increases, the loss through the bridge decreases. If this continues, a point is reached where the total losses equal the total gains around the loop, i. e. $\mu\beta=1$, the condition of oscillation. A further decrease in bridge loss makes $\mu\beta$ exceed unity and in this condition a slight disturbance, such as thermal noise, will initiate oscillation. The level of oscillation will continue to increase as long as $\mu\beta$ exceeds unity. However, some of the oscillator output power is impressed on the bead 4 of the compensating thermistor CT through transformer T2 and, therefore, tends to decrease its resistance. Consequently, the oscillation level will increase until the resistance of the bead of CT is forced down to the value that gives $\mu\beta=1$. Under this condition, the oscillation level remains constant, holding the resistance of CT at the value giving $\mu\beta$ equal exactly to unity. This operation will occur regardless of the ambient temperature as long as it does not exceed the top temperature for which the bridge was designed and as long as the oscillator amplification remains linear.

Let it be assumed that the ambient temperature to which the thermistors RT and CT are subjected decreases further. The resistance value of the compensating thermistor CT will then increase, the bridge will be unbalanced again and the oscillation will increase to a higher level. Increased oscillation power into thermistor CT decreases its resistance substantially to the value which it had before any change in ambient temperature. The resistance of the thermistor CT does not restore exactly to its previous value because the tube V1 is not usually perfectly linear. The tube gain changes very slightly with level requiring a slight change of the resistance of the thermistor CT to bring $\mu\beta$ back to unity. Each change in temperature causes a corresponding change in the level of the oscillator output current in the opposite direction until the bridge restores the condition of $\mu\beta=1$.

When power is first turned on the cold oscillator, the thermistor resistance is the so-called R$_0$ or no current resistance, and is of a high value. The amplitude of oscillation is large (being limited by tube overload), and as the thermistor warms up its resistance decreases. The resistance is continually decreasing and when the loss around the loop equals the gain and $\mu\beta$ becomes equal to unity, the circuit stabilizes and continues to oscillate at this amplitude which is the correct value to deliver just sufficient power to the heater of thermistor RT to drive its resistance down to the desired value (3,500 ohms). It can be seen from the above description that the ambient temperature compensating circuit of Fig. 2 maintains the resistance of the compensating thermistor CT essentially constant with ambient temperature by impressing power on its bead directly. As the thermistors RT and CT are made nearly identical in their thermal properties, the power that is applied to CT to obtain ambient temperature compensation by direct heating is proportional to the amount of power that should be applied to the heater of RT to obtain ambient temperature compensation of the latter thermistor.

Improved operation of the ambient temperature compensating circuit of Fig. 2 was attained in practical embodiments constructed and tested by correcting such troubles as motorboating, oscillation on both sides of bridge balance, lock out at low temperatures and thermal cross talk between RT and CT. The motorboating was corrected by increasing the effective Q of the tuned input circuit of tube V1 and by the use of high D.-C. feedback on that tube to produce compression.

The fact that $\mu\beta=1$ and $1-\mu\beta=0$ at the oscillating frequency means that the loop is sensitive to gain disturbances i. e. small gain changes may produce large amplitude changes. The thermistor with a time constant of from 30 to 90 seconds is able to correct for very slow gain changes. Fast level changes will be delayed by the logarithmic decrement of the tuned circuit. The only other thing to limit level changes is the compression action of the vacuum tube. Due to cathode by-passing of A.-C., feedback at D.-C. only occurs. The second order modulation has a D.-C. component which, due to the D.-C. feedback, causes an increase in negative bias and a consequent reduction of the tube's transconductance. Thus, increase in oscillation level reduces the $\mu$ of the loop slightly and requires a corresponding slight increase in $\beta$ to maintain $\mu\beta=1$. The increase in $\beta$ is obtained by a slight increase in bridge unbalance at the new operating point. There is also a third order product frequency independent of feedback which results in expansion rather than compression. However, there is second order modulation in tube V1 between (a) oscillator output energy fed back to the control grid of V1 as an input signal via the $\beta$ portion of the oscillator loop and (b) the second order distortion products appearing on the control grid of V1 because of direct current feedback through resistor R4. The second order modulation produces new third order distortion products of opposite polarity to the originally produced third order distortion product frequency so the new third order distortion products tend to produce compression instead of expansion. The compression due to second order modulation is intentionally made greater than expansion so that the net effect is compression.

The oscillation on the low side of the bridge balance may be eliminated by tuning the output transformer T1 to 4 kc. by connecting a suitable capacitor thereacross and by proper selection of the values of by-passing and decoupling arrangements. The low temperature lock out may be corrected by the use of a 10,000-ohm resistor for the resistor R2 in the feedback path. Thermal cross talk may be effectively eliminated by the use of a heat shield between the two beads of the resistors RT and CT in the glass envelope 1. It was found that production models employing the circuit of the invention, so improved, which were constructed and tested provided ambient temperature compensation of thermistors which is considerably more accurate than the arrangements which have been previously proposed for this purpose. These production models held the resistance of the regulating thermistor RT to a $\pm 2$ percent variation with variation in the ambient temperature from $-20°$ F. to $+160°$ F., which would hold the transmission variations of a repeater employing an associated thermometer regulator in the commercial carrier system above described to $\pm 0.1$ decibel.

Although the circuits of the invention illustrated and described employ a single pentode tube in the oscillator, it is to be understood that one or more triode or tetrode stages may be substituted therefor. Other changes in the circuits illustrated and described which are within the spirit and scope of the invention will occur to persons skilled in the art.

What is claimed is:

1. A circuit for producing temperature compensation of one or more thermistors over a wide range of ambient temperature conditions comprising an oscillation generator supplying electrical energy for indirectly heating said thermistors, said generator being electrically independent of said one or more thermistors, another thermistor having resistance-temperature characteristics similar to those of said one or more thermistors and located in close proximity thereto so as to be subject to the same ambient temperature conditions, and means for utilizing the varying resistance characteristic of said other thermistor with ambient temperature to control the operation of said oscillation generator so as to make its electrical energy output and thus the heating current supplied indirectly to said one or more thermistors provide compensation for ambient temperature over said wide range.

2. In combination, one or more thermistors of the indirectly heated type, a generator of sustained oscillations having an input, an output and a feedback loop therebetween, said generator being electrically independent of said one or more thermistors, another thermistor of the directly heated type having thermal properties similar to those of said one or more thermistors and located in close proximity thereto so that all thermistors are subjected to the same ambient temperature conditions, a four-arm bridge circuit in said feedback loop, and including said other thermistor in one arm thereof, the balance of said bridge circuit being dependent on the resistance value of said other thermistor and thus on the heating current supplied thereto from said generator output as well as the ambient temperature, the amount of energy fed back over said loop from the output to the input of said generator being dependent upon the magnitude of momentary changes in the resistance of said other thermistor, and means to supply the resultant output current of said generator as indirect heating current to said one or more thermistors to compensate them for ambient temperature conditions over that range.

3. In combination, one or more thermistors of the indirectly heated type, a generator of sustained oscillations having a feedback loop connected between its output and input, said generator being electrically independent of said one or more thermistors, another thermistor which is of the directly heated type, having thermal properties similar to those of said one or more thermistors and located in close proximity to said one or more thermistors so that the several thermistors are subjected to the same ambient temperature conditions, a four-arm bridge circuit connected in said feedback loop, and including said other thermistor in one arm thereof so that said other thermistor is heated electrically from the output of said generator, the balance of said bridge circuit being dependent on the resistance of said other thermistor which in turn is determined both by the oscillator output current flowing therethrough and the ambient temperature, the amount of energy fed back over said loop from the output to the input of said generator being dependent upon momentary changes in the resistance of said other thermistor, and means to supply the output current of said generator as heating current to said one or more thermistors, the circuit constants of the combination being selected to make this heating current compensate said one or more thermistors for ambient temperature variations over a wide temperature range.

4. The circuit of claim 1, in which said oscillation generator includes an amplifier supplying said electrical energy to said one or more thermistors, said amplifier having direct current negative feedback means for decreasing the gain thereof in response to electrical energy level increases in order to provide a more stable electrical energy level.

5. The circuit of claim 1, in which said oscillation generator comprises an amplifying device having its output connected to its input to form an oscillatory loop, said loop being tuned to a desired frequency, said amplifying device having an associated feedback circuit such as to provide a given amount of compression distortion in the action of said device, which will assist in stabilizing the oscillation level in said loop.

6. The combination of claim 2, in which said oscillation generator comprises a vacuum tube amplifying device having its output coupled to its input to provide said feedback loop, and means for providing direct current feedback in response to second order modulation products in said amplifying device to provide a compression characteristic therefor which will assist in stabilizing the oscillation level in said loop.

7. The circuit of claim 1 in which said oscillation generator comprises an amplifier having its output connected to its input to form an oscillatory loop for supplying said electrical energy to said one or more thermistors, said oscillatory loop also applying a portion of said electrical energy to said amplifier input, and means in said amplifier for providing negative feedback at frequencies corresponding to at least one modulation product frequency of said amplifier but having no appreciable negative feedback at other frequencies, said amplifier utilizing said one fedback modulation product frequency to obtain an amplification characteristic having a desired correction property substantially without change in amplifier gain at the frequency of said electrical energy.

8. The circuit of claim 1 in which said oscillation generator comprises an amplifier having a distortion characteristic and supplying said electrical energy to said one or more thermistors, and a feedback path from the output to the input of said amplifier for at least one second order distortion product frequency to control at least one third order distortion product at the output of said amplifier thereby improving the distortion characteristic of said amplifier.

9. The circuit of claim 1 in which said oscillation generator comprises an amplifier whose gain is substantially independent of the level of said electrical energy, said amplifier comprising an amplifying device supplying said electrical energy to said one or more thermistors and in the output thereof second and third order distortion products, said third order distortion products being of such polarity as to produce increased gain in said device for increased level of said electrical energy, a first feedback path for applying a portion of said electrical energy to the input of said amplifying device, and a second feedback path for applying a portion of said second order distortion products to the input of said amplifying device to create new third order distortion products by second order modulation in said device between said fed back second portions of said order distortion products and said electrical energy, said last-mentioned third order modulation products being of opposite polarity to said first-mentioned third order modulation products thereby producing cancellation of the gain changes in said device due to said first-mentioned third order distortion products.

10. The combination of claim 2 in which said oscillation generator comprises an amplifier circuit having feedback means for controlling the amplitude of a first distortion component produced by said amplifier circuit, said amplifier feedback means having appreciable transmission at frequencies corresponding to a second distortion product of said amplifier circuit and substantially no transmission at other frequencies, said amplifier circuit utilizing said second order distortion product to produce a second distortion component of a polarity opposite to the polarity of said first distortion component and thereby controlling the amplitude of said first distortion component.

11. The combination of claim 2 in which said oscillator generator comprises an amplifier having input and output terminals, and means for connecting said amplifier input and output terminals to said generator input and output, respectively, said connecting means including means for changing the amplitude of a distortion component in said amplifier without affecting the gain thereof, said last-mentioned means consisting of a feedback impedance connected in both said generator input and said generator output, said impedance providing appreciable transmission of second order distortion products of said amplifier included in said sustained oscillations but having no appreciable transmission of said sustained oscillations, said amplifier utilizing said second order distortion products to produce another distortion component substantially equivalent to said first-mentioned distortion component but having a polarity opposite thereto for changing the amplitude of said first-mentioned component.

12. In combination with an electrical circuit including a first thermistor and means for indirectly heating said first thermistor, an ambient temperature compensating circuit for said first thermistor comprising a second thermistor exposed to the same ambient temperature as said first thermistor and subject to changes in resistance as the ambient temperature varies and as the electrical energy supplied thereto varies, a source of stable oscillations electrically independent of said first thermistor but including said second thermistor and producing stable oscillations at a single value of resistance of said second thermistor, said source including variable impedance means responsive to resistance changes in said second thermistor for regulating the amplitude of stable oscillations produced by said source, means for applying a portion of the output of said source to said second thermistor to change the resistance thereof in a direction opposite to and in an amount substantially equal to previous changes caused by ambient temperature variations to restore and maintain the resistance of said second thermistor to said single value for stable oscillations, and means for applying another portion of the output of said source to said indirect heating means to control the resistance of said first thermistor.

References Cited in the file of this patent

UNITED STATES PATENTS

| 2,163,403 | Meacham | June 20, 1939 |
| 2,258,128 | Black | Oct. 7, 1941 |
| 2,269,001 | Blumlein | Jan. 6, 1942 |
| 2,341,013 | Black | Feb. 8, 1944 |
| 2,379,694 | Edson | July 3, 1945 |
| 2,426,589 | Bollman | Sept. 2, 1947 |
| 2,480,201 | Selove | Aug. 30, 1949 |
| 2,496,723 | Hipple | Feb. 7, 1950 |
| 2,545,985 | Baker | Mar. 20, 1951 |
| 2,554,087 | Breimer | May 22, 1951 |
| 2,587,750 | Morrison | Mar. 4, 1952 |

FOREIGN PATENTS

| 474,522 | Great Britain | Nov. 2, 1937 |

UNITED STATES PATENT OFFICE

CERTIFICATE OF CORRECTION

Patent No. 2,806,200

September 10, 1957

Raymond W. Ketchledge

It is hereby certified that error appears in the printed specification of the above numbered patent requiring correction and that the said Letters Patent should read as corrected below.

Column 9, line 30, after "and" insert --having--; line 41, strike out "second" and insert the same after "said", same line.

Signed and sealed this 3rd day of December 1957.

(SEAL)
Attest:
KARL H. AXLINE
Attesting Officer

ROBERT C. WATSON
Commissioner of Patents